United States Patent [19]
Yerushalmi et al.

[11] Patent Number: 5,211,922
[45] Date of Patent: May 18, 1993

[54] PROCESS FOR THE RECOVERY OF VALUES FROM SECONDARY ALUMINUM DROSS

[75] Inventors: Dan Yerushalmi, Cleveland, Ohio; Richard C. Bennett, Park Forest, Ill.

[73] Assignee: Aluminum Company of America, Pittsburgh, Pa.

[21] Appl. No.: 762,066

[22] Filed: Sep. 18, 1991

Related U.S. Application Data

[63] Continuation of Ser. No. 683,091, Apr. 19, 1991, abandoned, which is a continuation of Ser. No. 451,298, Dec. 15, 1989, abandoned.

[51] Int. Cl.⁵ .................... C22B 21/00; C22B 26/00; C01F 7/00; C01D 3/00
[52] U.S. Cl. .................................. 423/131; 423/111; 423/208; 23/302 R; 23/302 T; 23/304
[58] Field of Search .................. 423/111, 131, 208; 23/302 R, 302 T, 304; 75/10.47, 10.54, 586, 672; 159/47.3, DIG. 8

[56] References Cited

U.S. PATENT DOCUMENTS

| | | | |
|---|---|---|---|
| 3,642,454 | 2/1972 | Nylander | 23/304 |
| 3,770,424 | 11/1973 | Floyd et al. | 75/68 R |
| 3,852,044 | 12/1974 | Neitzel et al. | 23/302 T |
| 4,030,914 | 6/1977 | Papafingos et al. | 75/68 R |
| 4,060,118 | 11/1977 | Papafingos et al. | 423/111 |
| 4,073,644 | 2/1978 | Papafingos et al. | 75/24 |
| 4,090,916 | 5/1978 | Papafingos et al. | 75/68 R |
| 4,252,776 | 2/1981 | Huckabay et al. | 423/131 |
| 4,275,847 | 6/1981 | Bahr et al. | 423/111 |
| 4,379,718 | 4/1983 | Grantham et al. | 75/24 |
| 4,569,723 | 2/1986 | Lyon et al. | 23/302 T |
| 4,723,962 | 2/1988 | Mehta | 23/302 R |
| 4,732,606 | 3/1988 | Kobele et al. | 423/131 |
| 4,752,328 | 6/1988 | Peterson | 75/68 R |
| 4,877,448 | 10/1989 | Lindsay | 75/10.35 |

FOREIGN PATENT DOCUMENTS

| | | | |
|---|---|---|---|
| 275814 | 7/1988 | European Pat. Off. | 23/302 R |
| 1549979 | 8/1979 | United Kingdom . | |

OTHER PUBLICATIONS

CRC Handbook of Chemistry and Physics, 52nd ed., 1972, pp. B-105, B-122, B-137.

Primary Examiner—Wayne Langel
Assistant Examiner—Steven Bos
Attorney, Agent, or Firm—David V. Radack; David W. Brownlee

[57] ABSTRACT

A process for recovery of metallic aluminum, sodium and potassium chloride and an aluminum oxide-metallic aluminum product from secondary aluminum dross. A secondary aluminum dross feed is separated by particle size into a first dross portion which is water leached, filtered, evaporated in an evaporator to produce crystallized sodium and potassium chloride salts, magnesium chloride remaining in solution. A purge stream is removed from the evaporator wherein the crystallized salts are separated therefrom. The purge stream is then discharged onto the crystallized salts.

8 Claims, 1 Drawing Sheet

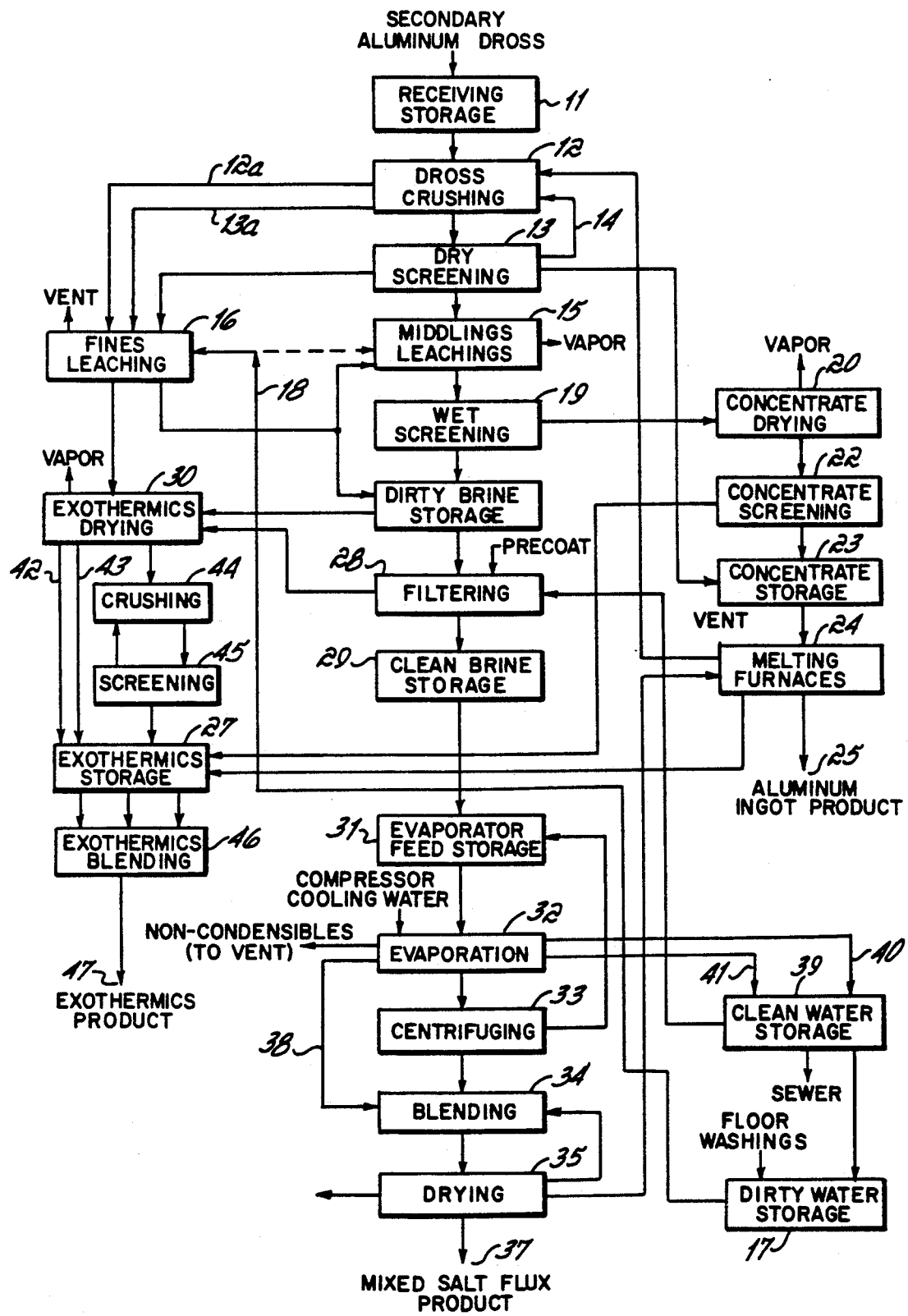

PROCESS FOR THE RECOVERY OF VALUES FROM SECONDARY ALUMINUM DROSS

This application is a continuation of application Ser. No. 07/683,091 filed Apr. 10, 1991, now abandoned, which is a continuation of application Ser. No. 07/451,298 filed Dec. 15, 1989, now abandoned.

BACKGROUND OF THE INVENTION

The present invention is generally directed to a novel and improved process for the recovery of metal, salt and oxide values present in secondary or low grade aluminum dross. More particularly, this invention is directed to a process for recovering the metallic aluminum, metal salt, and aluminum oxide components present in secondary aluminum dross. In this regard, an important aspect of the present invention specifically concerns a closed loop process for treating secondary aluminum dross to recover metallic aluminum, eutectic mixtures of sodium and potassium chlorides suitable for re-use as salt fluxes in aluminum smelting furnaces, and an aluminum oxide product having high aluminum fine and low chloride contents suitable for use as an exothermic topping in the production of steel ingots.

During the smelting of aluminum scrap such as used beverage containers and the like, large quantities of salt flux, typically sodium and potassium chloride are added to the smelter furnaces. This flux accumulates on top of the molten bath and forms a dross which, for the most part, has been either disposed of in its entirety in landfills, or subjected to limited processing wherein only a portion of the aluminum values contained therein are recovered with the remainder being transported from the processing site for landfill disposal.

A currently utilized procedure for the processing of secondary aluminum dross and scrap involves initially reducing the particulate size of the dross, typically by impact and ball milling processing. Following particle reduction, the dross is then melted under a salt flux cover to dissolve the contaminants therein, mostly aluminum oxide, and recover the aluminum metal. Typically, rich dross (containing 30 to 70% aluminum) and low-grade dross (containing 5 to 25% aluminum) are melted in rotary furnaces, using a sodium chloride-potassium chloride flux which may include 2 to 5% cryolite. As the flux becomes contaminated with aluminum oxide, it is removed as salt slag by skimming or raking and solidified. Salt slag generated by this process generally ranges up to 35% of the melt charge in the furnaces. While this salt slag contains potentially valuable materials that could be recovered, it is a general practice to pay for its removal from the production site and disposal in a landfill. Furthermore, soluble salts present therein represent a potential source of pollution to surface and ground water supplies. Accordingly, it is becoming increasingly important both for economic as well as environmental reasons, to eliminate the need for landfill disposal of these salt slags.

Other previously employed commercial procedures for processing secondary aluminum dross have generally involved crushing the aluminum dross chunks into smaller particles and then, without size separation, leaching those particles on a continuous basis.

In general, all of these prior commercial procedures do not permit maximum recovery of aluminum values and also produce aluminum oxide and other residues which also require landfill disposal.

SUMMARY OF THE INVENTION

The present invention overcomes the problems and disadvantages of these prior procedures for processing secondary aluminum dross by providing a novel process for treating such dross which results in substantially enhanced recoveries of metallic aluminum, eutectic mixtures of sodium and potassium chloride salt fluxes, and an aluminum oxide-metallic aluminum exothermic product characterized by high aluminum and low chloride contents, making it particularly suitable for use in the production of steel ingots. As such, this process not only enables the increased recovery of these components of secondary aluminum dross as commercially usable products, but also significantly reduces, if not totally eliminates, the need for landfill disposal thereof.

In accordance with an important aspect of the present invention, secondary aluminum dross, as received from the aluminum smelter, is initially crushed and sized on a dry basis and then split into at least two fractions, one containing the fines or smaller particles (typically on the order of −10 mesh) and the other containing the middling particles (typically on the order of −4 inch +10 mesh). Each of these streams is then processed in separate leaching operations so as to minimize loss of metallic aluminum values therein.

The middlings from the crushing and sizing operation are subjected to a batch leaching step wherein the metal salt content thereof is solubilized. The discharge from that leaching step is then subjected to a wet screening step resulting in a first stream containing larger particles (typically on the order of +20 mesh) which contain a relatively high metallic aluminum content and some aluminum oxide. This first stream, upon being dried, is then processed in a further dry screening operation wherein the smaller aluminum-containing particles are separated for use as a metallic aluminum enriching agent in the exothermics product produced by this process. Only the larger aluminum-containing particles are then supplied to the melting furnace, thereby avoiding loss of metallic aluminum values due to unwanted conversion of the aluminum content in the smaller particles to aluminum oxide in the melting furnace.

The −20 mesh and brine component of the discharge from the middlings leaching step is then filtered, typically with a rotary vacuum filter using a diatamaceous earth filtering media. The solids recovered therefrom, which consists mostly of aluminum oxide, are then sent to the exothermics phase of the process. The clean brine filtrate is subjected to evaporation-crystallization and the sodium and potassium chloride salts recovered therefrom then are dried. While various types of evaporator-crystallizers may be used for this process, it has been found that mechanical vapor recompression, forced circulation evaporators are particularly suitable.

An important aspect of the evaporation-crystallization process feature of the present invention involves purging of a portion of the slurry within the evaporator-crystallizer so as to prevent the build up of magnesium and calcium chlorides in the slurry which, due to their relatively high solubility, would otherwise increase the boiling point of the slurry to such an extent as to require excessive evaporator shut down.

The salt flux product so produced in the evaporative crystallizer has an eutectic mixed salt content which is substantially the same as that of the fluxing salt used in the smelting operation from which the secondary aluminum dross was obtained. Accordingly, this mixed salt product is suitable for re-use at such smelting facility.

In accordance with a further important aspect of the present invention the dross fines, those typically having a −10 mesh size, are, as previously noted, separately processed on a batch basis in a fines leaching operation. Metal salts from the brine produced in the fines leaching operation are recovered by processing that brine with the middlings leaching brine as discussed above or by using the brine as the leach solution in the middlings leach operation.

The solids discharge from the fines leaching operation which contains metallic aluminum and aluminum oxide particles is then dried and blended with the smaller metallic aluminum particles which were previously separated from the charge to the melting furnace. In this manner, an exothermics topping product is obtained which is characterized by a substantially high aluminum content, typically on the order of 20 to 30% or more, and a corresponding low chlorides content, below 5% and preferably on the order of 1%. As such, this product finds particularly advantageous utility as an exothermic topping in steel ingot production.

It is, therefore, an important object of the present invention to provide an improved process for treating secondary or low grade aluminum dross to recover increased amounts of metallic aluminum, metal salts and aluminum oxide therefrom.

Another object of the present invention is to provide an improved process for treating secondary aluminum dross which substantially minimizes, if not totally eliminates, the need for landfill disposal.

Another object of the present invention, is to provide an improved process for treating secondary aluminum dross which utilizes at least two parallel leaching operations to separately treat dross particles of different size distributions.

Another object of the present invention is to provide an improved aluminum dross treating process which enables the recovery of substantially increased amounts of metallic aluminum from such dross.

Another object of the present invention is to provide an improved process for treating aluminum dross which enables the recovery of a mixed salt flux product having substantially the same make-up as the salt flux used in the aluminum smelting process from which such dross was produced.

Another object of the present invention is to provide an improved process for treating secondary aluminum dross which enables the recovery of an aluminum oxide-metallic aluminum particulate product having an exceptionally high metallic aluminum content and an exceptionally low chloride content.

These and other objects of the present invention will be apparent from the following description of a preferred embodiment of this invention taken in conjunction with the accompanying FIGURE illustrating a schematic flow diagram of a secondary aluminum dross recovery process embodying the present invention.

BRIEF DESCRIPTION OF THE DRAWING

The sole FIGURE shows a processing system for treating secondary or low grade aluminum dross.

DETAILED DESCRIPTION OF PREFERRED EMBODIMENT

Referring to the FIGURE, a processing system for treating secondary or low grade aluminum dross in accordance with the present invention is generally designated by the reference 10. As shown, secondary aluminum dross is transported, usually by truck or rail, to a receiving and storage site 11. While the make-up of this dross will vary depending upon the source of supply, it will typically contain from about 10 to 25% metallic aluminum, from about 35 to 45% metallic salt usually comprising equal amounts of sodium and potassium chloride as well as relatively small amounts of magnesium and calcium chlorides and/or cryolite, and from about 35 to 45% aluminum oxide.

Dross is transported by any suitable solids handling device such as a conveyor or front end loader to a dross crushing location 12. A typical crushing operation may involve discharging the dross onto a suitably sized grizzly with the discharge therefrom being transferred by conveyor to an impact crusher wherein the larger particles are reduced in size with the predominant portion of such crushed dross, in the order of 80%, being converted to a −4 inch +10 mesh size. It will be appreciated, however, that other particle reduction devices may be substituted for the impact crusher and that the size reduction of the crushed dross may vary depending upon the composition of the dross and other factors.

In accordance with an important aspect of the present invention, the output from the crusher is transferred to a dry screening operation 13 wherein at least two, and a typically three, separate particle size fractions are produced. By way of example, a two-deck screen arrangement can be employed wherein three separate particle size streams are produced.

The larger size particles, for example those having a 4 inch or larger size, can be directly transmitted to the melting furnace or, if not of sufficient aluminum content, returned to the dross crushing operation 12 as shown by the recycle line 14. The majority of the crushed aluminum dross, typically having particles of about −4 inch +10 mesh size, is supplied to a middlings leaching operation 15 and the fines or smaller particles, for example those typically having a size of about −10 mesh are supplied to a fines leaching operation 16.

In the middlings leaching operation, leach water from a water storage location 17 is supplied via a process line 18 to a suitable tank which has been previously charged with a batch of the dross middling particles. Alternatively, brine produced in leaching the −10 mesh fines can be used to leach the middling particles. The use of ready-mix concrete mixing tanks which are rotatable is preferred due to their relatively low cost and ability to tolerate a wide variation in the make-up of the dross particles. During the leaching operation the soluble metal salts in the dross are dissolved leaving metallic aluminum and aluminum oxide particles. The leaching operation is normally conducted at atmospheric pressure using a minimum amount of leach water to extract the maximum amount of salt since, as will be appreciated, all such leach water which is added to this phase of the process must be subsequently removed by evaporation. If desired, caustic soda can be added to regulate the pH of the system to a level above 7 to minimize production of byproduct gases and to provide increased recovery of metallic aluminum product.

After the metal salt content in the middlings dross particles has been solubilized, the contents in the leaching tank is sent to a wet screening operation 19 which, by way of illustration, can be a 20 mesh screen. The +20 mesh discharge from that screen is then supplied to a concentrate drying operation 20 and the −20 mesh particles and dirty brine sent to a dirty brine storage location 21.

Moisture removal from the +20 mesh particles received in concentrate drying operation can be achieved by any suitable dryer, however, the use of a rotary drum dryer is generally preferred. After substantially all of the moisture is removed in the drying operation, the particulates are discharged to a further screening operation 22 wherein the larger particles, for example those having a +8 mesh size, are then transferred to a concentrate storage location 23 and from the concentrate storage location to one or more rotary furnaces in a melting furnace operation 24. A suitable fluxing salt is overlayed on these particles. A flame generating portion adjacent the rear end of each of the rotary furnaces propagates a flame forwardly toward the open end. It will be appreciated, however, that other flame generating arrangements are suitable in this process. The furnaces are rotated until the desired melting has been achieved and the metallic aluminum then discharged therefrom to produce the substantially pure metallic aluminum ingot product generally designated by the reference 25.

In accordance with an important aspect of the present invention, the smaller aluminum containing particles, those having a −8 or smaller mesh size are not discharged to the melting furnaces 24 since the metallic aluminum content thereof would be lost due to the burning thereof (i.e. conversion to aluminum oxide). These smaller aluminum containing particles instead are transmitted as shown by flow line 26 to an exothermics storage location 27 where, as will be described, they are blended with other particulates obtained from the fines leaching circuit to provide the improved exothermics product of this invention.

In the illustrated embodiment, the contents in the dirty brine storage location 21 which generally comprise −20 mesh aluminum oxide particles and brine are processed in a filtering operation 28 to produce a clean brine filtrate which is supplied to a clean brine storage area 29 and a filter cake (mostly aluminum oxide) which is supplied to an exothermics drying operation 30. Rotary drum vacuum filters which are precoated with diatomaceous earth are preferred, however, other suitable filtration devices may be used in place thereof.

Clean brine storage location 29 will normally include one or more storage tanks of suitable size, each which is preferably equipped with an agitator. As shown, clean brine from that storage location 29 is supplied to an evaporator feed storage location 31. If desired, a preheater can be interposed between brine and the evaporator feed storage locations 29 and 31, respectively. Typically, the evaporator feed storage location will be in the form of an evaporator feed tank which is also equipped with an agitator. While multiple-effect vacuum evaporators may be used, it has been found that the desired crystallization of the sodium and potassium chloride content in the brine can be effectively and economically achieved through the use of an atmospheric pressure, mechanical or thermal recompression forced circulation evaporator. Preferably, the feed to the evaporator is heated in one or more preheaters which use the condensate from the evaporator heater as the heating medium.

Slurry discharge from the elutriation leg of the evaporator is sent to a centrifuge 33 and the wet salt cake from the centrifuge supplied to a blending station 34 wherein it is combined with dried salt in a pug mill or equivalent mixer.

Discharge from the mixer is then sent to a drying station 35 which, if desired, will include a conventional rotary dryer equipped with a gas fired air heater. Discharge from the dryer can be transferred by a conveyor for return to the mixer with a portion such discharge being selectively withdrawn and sent to a screening operation wherein the fines so separated are returned to the pug mill mixer as the dried salt source for blending station 34 via a recycle line 36.

It will be appreciated that during evaporation, the potassium and sodium chloride contents of the brine will be readily crystallized, however, magnesium chloride and other highly soluble salts which may be present in the brine will typically remain in solution. As such, continued operation of the evaporator will result in a raising of the boiling point of the slurry thereby necessitating evaporator shut down. In accordance with an important aspect of this invention, stabilization of the boiling point of the slurry in the evaporator is effectively achieved by removal of a purge from that slurry in the evaporator via a purged line 38. As shown in the illustrated embodiment, this purge line feeds the purge withdrawn from the evaporator to the drying operation 35 wherein it is selectively discharged either into the pug mill or equivalent mixer, or alternatively, onto the mixed salt contained in the dryer.

As shown in the FIGURE, in the embodiment of the present invention wherein a mechanical recompression, forced circulation evaporator is utilized, the compressor cooling water and condensate are supplied to a clean water storage tank 39 via process lines 40 and 41 respectively. Overflow from this clean water storage tank can be discharged to a sewer without any adverse environmental consequences and, correspondingly, this same water may be used as make-up water which is supplied to a previously mentioned dirty water storage tank 17. Likewise, floor washings from various locations in this facility can be supplied to the dirty water storage tank 17.

As previously noted, an important aspect of the present invention involves the use of parallel digestion steps, i.e. the middlings leaching operation 15 and the fines leaching operation 16. Crushed dross particles of reduced size, typically −10 mesh, are supplied from the dry screening operation 12 to the fines leaching operation via process line 13a together with crusher spillage from the dross crushing operation 12 via process line 12a. In a preferred embodiment, the fines leaching operation is conducted in a screw classifier having a pool end which is sized to enable controlled leaching of the fines to dissolve the metal salt content thereof. The solids which include metallic aluminum and aluminum oxide are transferred from the pool end of the screw classifier to the exothermics drying operation 30 which preferably includes a rotary drum dryer equipped with screens to permit classification of the particles which are dried therein. For example, particulates in the order of 10 and 12 mesh size, upon being dried, are supplied to the exothermics storage operation 27 as generally depicted by process lines 42 and 43, respectively. Correspondingly, oversized particulates from the exothermics drying operation can be subjected to a crushing operation 44 with the product thereof being transferred to a screening operation 45. The thus dried particulates are transferred to the exothermics storage area 27 which also receives a high metallic aluminum content particulate from the concentrate screening operation 22. Admixture of these aluminum oxide and aluminum containing particulates is performed in an exothermics blending operation designated by the reference 46.

The exothermics product obtained from the blending operation 46 is characterized by a relatively high aluminum content typically in the order of from about 20 to 30% or more and a relatively low chlorides content, typically less than 5 and preferably less than 1%. As such, the aluminum-aluminum oxide product produced by this process is particularly suitable for use as an exothermics topping in steel ingot production.

It will be apparent to those skilled in this art that various aspects of the present invention can be modified without departing from the spirit and scope thereof. Accordingly, this invention is to be construed and limited only by the scope of the appended claims.

We claim:

1. In a process for the recovery of metallic aluminum, mixtures of sodium and potassium chlorides, and an aluminum oxide-metallic aluminum product having high aluminum and low chloride contents from secondary aluminum dross, said process including the steps of providing a secondary aluminum dross feed containing aluminum, aluminum oxide and salts, separating the feed dross by particle size into at least a first dross portion and a second dross portion, treating the first dross portion with leach water to dissolve the salt content thereof, wherein the improvement comprises:
    (a) filtering the leached first dross portion to produce a filtrate containing dissolved sodium and potassium chloride salts and magnesium chloride;
    (b) evaporating the filtrate in an evaporator to produce a slurry containing crystallized sodium and potassium chloride salts, wherein the magnesium chloride remains in solution in the slurry;
    (c) removing a purge stream of slurry from the evaporator;
    (d) subjecting the slurry from which the purge stream has been removed to a liquid solid separation step to remove the crystallized sodium and potassium chloride salts therefrom; and
    (e) discharging said purge stream onto said crystallized sodium and potassium chloride salts.

2. The process of claim 1 further comprising drying the removed crystallized sodium and potassium chloride salts to recover a mixture of sodium and potassium chloride salts which is suitable for use as a salt flux in an aluminum smelting furnace.

3. The process of claim 1, including
    feeding said filtrate into an evaporator feed storage means for subsequent supplying to said evaporator.

4. The process of claim 1, wherein step (d) comprises:
    discharging the slurry from which the purge stream has been removed to a centrifuge;
    centrifuging the slurry to create a wet salt cake;
    supplying said wet salt cake to a blending station; and
    combining said wet salt cake with dried salt in said blending station.

5. The process of claim 4, including
    discharging said purge stream into said blending station.

6. The process of claim 5, including
    transferring said crystallized sodium and potassium chloride salts and said purge stream into a drying station to create a mixed salt flux product.

7. The process of claim 6, including
    after drying in said drying station, returning a first portion of said mixed salt flux product to said blending station.

8. A method of separating salts, including potassium, sodium and magnesium chloride salts, from a brine created by treating secondary aluminum dross with leach water, said method comprising:
    (a) evaporating said brine in an evaporator to produce a slurry containing crystallized sodium and potassium chloride salts, wherein magnesium chloride salt remains in solution in the slurry;
    (b) removing a purge stream of said slurry from said evaporator;
    (c) subjecting the slurry from which the purge stream has been removed to a liquid solid separation step to remove the crystallized sodium and potassium chloride salts therefrom; and
    (d) discharging said purged slurry onto said crystallized sodium and potassium chloride salts.

* * * * *